United States Patent

Tixier

[15] 3,688,558
[45] Sept. 5, 1972

[54] ESTIMATION OF THERMAL FEELING INTENSITY ON HUMAN SKIN

[72] Inventor: Michel Tixier, Billancourt, France

[73] Assignees: Regie Nationale des Usines Renault, Billancourt; Automobiles Peugeot, Paris, France

[22] Filed: Sept. 16, 1970

[21] Appl. No.: 72,603

[52] U.S. Cl. .......................... 73/15, 73/159, 73/432 R
[51] Int. Cl. ......................... G01n 25/00, G01n 33/36
[58] Field of Search .......................... 73/15, 432, 159

[56] References Cited

UNITED STATES PATENTS 2,769,334 11/1956 Soehngen .................... 73/15 R
2,998,720 9/1961 Williams ..................... 73/15 R

OTHER PUBLICATIONS

Copper Man Now in Use To Test Cold. A clipping from the Richmond Times–Dispatch, Tuesday, Jan. 30, 1945.

*Primary Examiner*—S. Clement Swisher
*Attorney*—Stevens, Davis, Miller & Mosher

[57] ABSTRACT

A method of determining the intensity of the thermal feelings which would be produced on the human skin in direct contact with different materials. The material in question is heated or cooled to a predetermined temperature and a device having a surface with characteristics of conductively and heat capacity etc simulating that of human skin is brought into contact therewith. A thermal transducer within the device provides and indication of the intensity of feeling which the material would produce if it came in contact with human skin.

13 Claims, 4 Drawing Figures

ESTIMATION OF THERMAL FEELING INTENSITY ON HUMAN SKIN

The present invention relates in general to methods and devices for experimentally and indirectly estimating the physiological reactions of human skin in case of thermal shock due to the contact between surface layers of the skin with objects of miscellaneous types.

In fact, current experience teaches that several bodies of different nature or surface condition, such as marble, steel, wood, plastics, foam, leather textile materials, kept at the same predetermined temperature, produce different feelings when contacted by the human skin; more particularly, the intensity of the feeling of warmth or cold varies according to the nature of the materials being tested.

Thus, although this application cannot be regarded as limiting the field of investigation in this subject, it is of obvious interest, when completing to an advanced stage the study of the characteristics of a passenger's vehicle, to select with a full knowledge of the art the nature of the materials for lining the seats (upholstery), the floor, the facia, the instrument panel, the steering wheel, with due consideration for the possible feeling of "burn" or cold likely to be received by the passenger or driver when they step into the vehicle after the latter has been exposed to a very high or very low temperature; now this feeling depends on the complexity of the contact conditions and also on the thermal contact properties of the materials themselves. Thus, by way of example, it may be reminded that the temperature of the seats of a closed vehicle exposed to sun light may be as high as 100°C to 110°C (212°F to 230°F).

Under these conditions, it is clear that the driver's and passenger's comfort depends on the nature of the lining or upholstering material contacting their skin, that is, on the particular thermal shock experienced during the first seconds of the heat exchange taking place between the seat and the users; accurate tests proved that the pain felt by a user is not only proportional to the seat or steering wheel temperature but also to the intensity and duration of these heat exchanges which are attended by a considerable increase or decrease in the surface temperature of the contacting area of the skin. Thus, the study of this temperature increment proved that the threshold of pain was attained with a temperature differential of the order of 10°C in relation to the local temperature of the skin (30°C to 35°C).

It is therefore the essential object of this invention to determine a measurable magnitude proportional to the feeling of discomfort or pain which is due to a relatively important thermal shock. Moreover, this invention contemplates the provision of a device adapted to convert this measurable magnitude into figures and to select among different materials as a function of their behavior during a thermal contact.

The following description given with reference to the attached drawing by way of example without however limiting the scope of the invention will afford a clearer understanding of this invention and of the manner in which the same may be embodied in practice. In the drawing.

Figure 1:
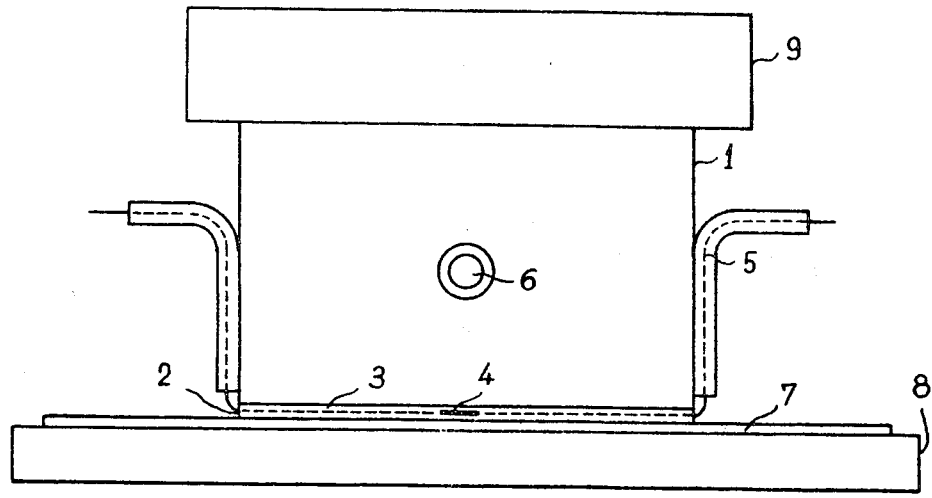
FIG. 1 is a side elevational view of the device of this invention.
Figure 2:
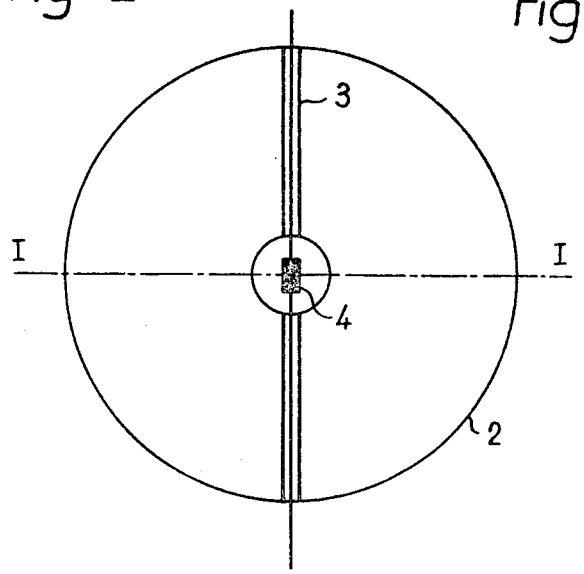
FIG. 2 is a plane view from above showing the contact area of the device and the material to be tested.
Figure 3:
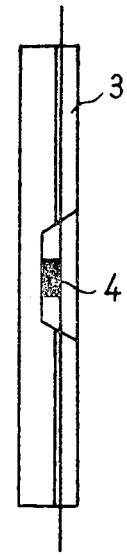
FIG. 3 is a section taken along the line I—I of FIG. 2.
Figure 4:
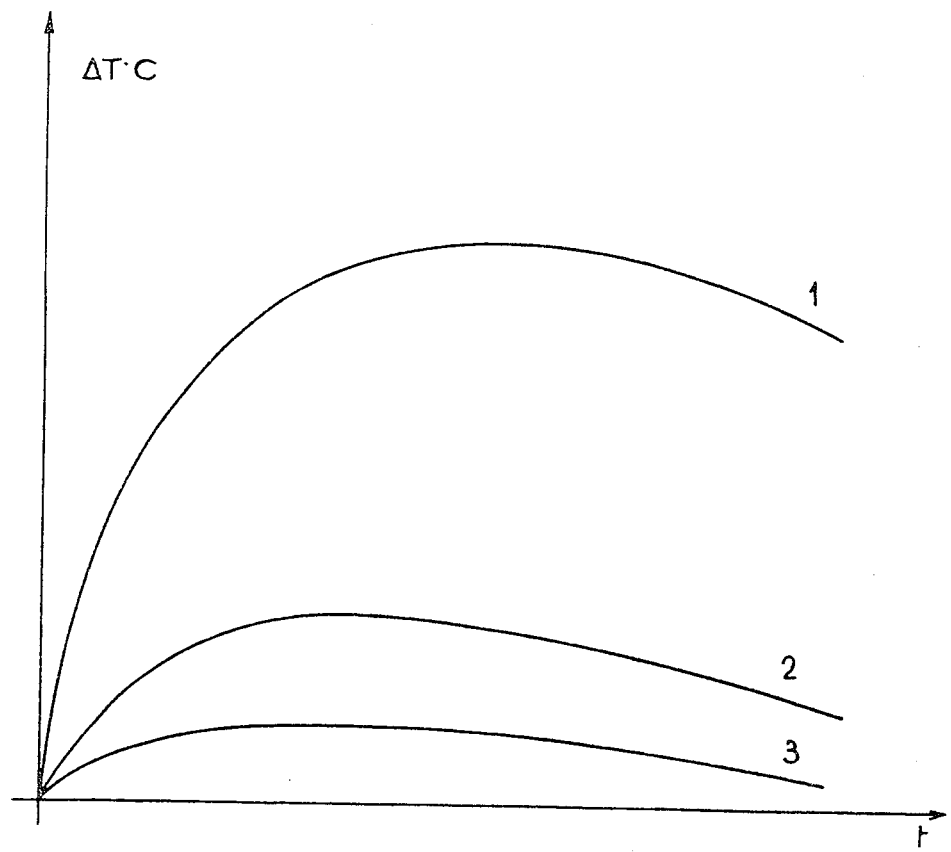

FIG. 4 is a typical example of a curve obtained with the device of this invention by using three different samples of materials. In the exemplary form of embodiment illustrated in the drawing and as shown more particularly in FIG. 1 the device consists essentially of a case having substantially cylindrical vertical side walls 1 of brass, and a glass bottom 2 secured in any known and suitable fashion to the vertical walls, for example by using an epoxy resin, this bottom comprising a diametral groove 3 formed in the face opposed to the sample to be tested, and comprises a flat thermo-electric weld 4 (such as Ni-Cr-Ni) cemented to its center, as shown in FIGS. 2 and 3. Two thermocouple outlets 5 are provided along the vertical walls of the case which comprises a lateral aperture 6 permitting a thermometer to be introduced into the case. Since the scope of the test is to determine the intensity of the thermal shock felt by the skin during its contact with a predetermined material heated to a relatively high temperature or cooled to a relatively low temperature, the magnitude selected as corresponding to this effect is the temperature increment obtaining at the level of the glass plate 2 which simulate the surface layers of the human skin. It will be noted that this invention may be referred to as a Dermothermometer.

To this end, a mass of material for lining the case of the Dermothermometer is selected among those having thermal characteristics similar to those of the epiderm; experience teaches that water can meet these requirements, notably if it is gelled by means of an organic substance such as agar-agar, in order to avoid the generation of convection currents due to the heat exchange taking place between the sample and the dermothermometer.

Still with a view toward making the nearest possible approach to normal practice conditions, the pressure exerted on the Dermothermometer is substantially equivalent to that exerted by the user's body on the lining or material to be tested, for example in the case of seat upholstery. Under these conditions the pressure was selected to be of the order of 40 grams per square centimeter; as the base surface area of the Dermothermometer approximates 50 square centimeters, as a rule, the upper portion of the device is weighted with a corresponding mass of 2 kilograms.

When carrying out the method of this invention, the temperature of the samples of materials to be tested is raised to, and stabilized at, a level corresponding to conditions approximating those of actual use by exposing the material during a suitable time period (about 15 mn) in an oven kept for example at about 100°C.

Meanwhile the Dermothermometer is heated to the physiological temperature of the skin area expected to contact the material being tested (about 32°C). Then the sample is extracted from the oven and applied upon a foam support 8 acting as a thermal insulator. The Dermothermometer is subsequently disposed with a view to obtain the best possible contact with the sample 7. In the case of a rigid body of material having a flat surface, even if the latter is somewhat irregular, it is necessary to coat the sample with a thin layer of a substance such as silicone-containing grease with a view toward assisting in reducing any heat resistance during the actual contact period.

The outer ends of the thermocouple 4 are connected to a recording apparatus, possibly through suitable amplifying means, and the signals are collected in the form of temperature increase curves ΔT as a function of the contact time $t$, of the order of 50 seconds, as illustrated in FIG. 4. The interesting characteristics thus obtained through these curves denote on the one hand the maximum temperature increase which corresponds to their peaks, and the time required for attaining these peaks.

It was found experimentally that the heat threshold was attained with a temperature differential ΔT of the order of 10°C in relation to the skin temperature; therefore, the lower the value of ΔT the better the properties of the tested material.

It will be noted that in this line of argument the curves shown in FIG. 4 which were obtained by using different samples 1, 2 and 3 clearly show that sample 3 provides a greater thermal comfort than samples 2 and 1.

Experience confirmed what could be inferred therefrom, i.e., that a material having good thermal contact properties at relatively high temperatures preserved these properties at relatively low temperature; also in this case material 3 proved to be the best one.

The other factor shown by the curves obtained with the device of this invention and similar to those of FIG. 4 is the time necessary for attaining the apex of the curve; this corresponds to the maximum heating time of the Dermothermometer; thus, the longer the heat transmission time, the more the material will be suited for its intended purpose under the above described conditions, and the greater the distance of the projection of its characteristic curve on the abscissa axis from its origin.

From the comparative study of the characteristic curve of various materials, obtained by using the method of this invention, it is possible to determine without difficulty, notably from the position of its apex in relation to the abscissa axis and to the ordinate axis, the material best suited for the specific use contemplated.

This application is particularly useful in the choice of a textile or upholstering material as a function of its thermal characteristics among several similar materials; this also applies to the choice of natural or synthetic leather among others having either different composition or undergone a different surface treatment.

Thus, in the case of natural leather, the condition of the surface layer constitutes an essential factor and the characteristics obtained by utilizing the Dermothermometer vary considerably according as they are derived from the previously treated right side or from the raw back side of the sample; thus, the surface treatments giving the best results can efficiently be determined.

Although this invention has been described with reference to a specific and single form of embodiment, it will readily occur to those skilled in the art that various modifications may be brought thereto without departing from the field of the invention and more particularly from the basic principles thereof as set forth hereinabove and in the attached claims, for example by replacing the flat thermoelectric weld with any other member having a similar function, such as a heat probe of the "sensor" type, a thermistance or a heat-responsive physico-chemical material.

What is claimed as new is:

1. A method of indirectly determining the intensity of the thermal feeling produced on the skin in direct contact with a sample material comprising the steps of
    a. bringing the temperature of the sample material to be tested to a temperature approximately that of actual use,
    b. bringing the temperature of a casing having a bottom portion composed of a composition simulating the surface layers of the skin to the physiological temperature of the skin area expected to contact said sample material,
    c. placing said sample material on a supporting surface,
    d. placing the bottom of said casing on said sample material, and
    e. measuring the change in temperature of the bottom portion of said casing, said temperature change being a measure of the intensity of the thermal feeling which would be produced on the skin in direct contact with said sample material.

2. The method defined by claim 1 wherein the sample material to be tested is brought to the temperature of actual use by heating said sample material.

3. The method defined by claim 1 wherein the casing is brought to the physiological temperature of the skin area by heating said casing.

4. The method defined by claim 1 which further comprises the step of exerting pressure on said sample material with the bottom of said casing, said pressure being substantially equivalent to that which would be exerted by the body of a subject on said sample material.

5. The method defined by claim 4 wherein said pressure is approximately 40 grams per square centimeter.

6. The method defined by claim 1 which further comprises the step of lining the casing with a lining material having thermal characteristics similar to these of the epiderm.

7. The method defined by claim 1 which further comprises the step of coating said sample material to reduce heat resistance during the period of contact with the bottom of said casing.

8. The method defined by claim 7 where said sample is coated with a silicone - containing grease.

9. A device for indirectly determining the intensity of the thermal feeling produced on the skin in direct contact with a sample material comprising
    a. a casing encompassing a predetermined volume containing a mass having thermal properties similar to those of the epiderm, said casing having a bottom portion with a groove formed therein on the internal surface thereof, and
    b. a thermoelectric device located within said groove, said sample material being placed in contact with the outer surface of the bottom portion of said casing, the change in temperature measured by said thermoelectric device being a measure of the intensity of the thermal feeling which would be produced on the skin in direct contact with said sample material.

10. The device defined by claim 9 wherein the mass encompassed by said casing and having properties similar to those of the epiderm consists of an organic gel.

11. The device defined by claim 10 wherein said organic gel is comprised of agar - agar 12. The device defined by claim 10 wherein an orifice is provided in the side wall of said casing to permit the insertion of a thermometer into the inner mass of said organic gel.

13. The device defined by claim 9 wherein the bottom portion of said casing consists of a glass plate.

* * * * *